United States Patent [19]

Horn et al.

[11] Patent Number: 4,590,242

[45] Date of Patent: May 20, 1986

[54] PRODUCTION OF LOW-SHRINKAGE NYLON MOLDINGS

[75] Inventors: Peter Horn, Heidelberg; Hellmut Bünsch, Leimen; Anton Hesse, Weinheim; Matthias Marx, Bad Durkheim; Dietmar Nissen, Heidelberg; Walter Heckmann, Weinheim, all of Fed. Rep. of Germany

[73] Assignee: BASF Aktiengesellschaft, Fed. Rep. of Germany

[21] Appl. No.: 513,839

[22] Filed: Jul. 14, 1983

[30] Foreign Application Priority Data

Jul. 6, 1982 [DE] Fed. Rep. of Germany ....... 3225137
Jul. 6, 1982 [DE] Fed. Rep. of Germany ....... 3225138

[51] Int. Cl.$^4$ .................. C08F 8/30; C08F 283/04; C08L 77/00
[52] U.S. Cl. .................................... 525/183; 525/43; 525/46; 525/47; 525/49; 525/184; 525/404; 525/421; 525/426; 525/445; 525/455; 525/529; 525/533
[58] Field of Search ............... 525/183, 184, 529, 533, 525/404, 455

[56] References Cited

U.S. PATENT DOCUMENTS 3,470,139  9/1969  Marshall et al.
3,539,662  11/1970  Hill et al.
3,770,689  11/1973  van der Loos et al.
3,793,399  2/1974   van der Loos et al.
4,448,956  5/1984   Lenke ................................ 525/183

Primary Examiner—John C. Bleutge
Assistant Examiner—A. L. Carrillo
Attorney, Agent, or Firm—Keil & Weinkauf

[57] ABSTRACT

Low-shrinkage nylon moldings are produced by activated alkaline lactam polymerization, preferably using the reactive injection molding technique, by a process wherein the polymerization is carried out in the presence of from 5 to 80% by weight of a polymer P which
1. is completely soluble in the lactam,
2. separates out in the course of polymerization at a conversion of from 1 to 50%,
3. is composed of one or more blocks which are compatible with polylactam and one or more blocks which are incompatible therewith, and preferably
4. possesses functional groups which are incorporated into the growing polylactam chain.

4 Claims, No Drawings

PRODUCTION OF LOW-SHRINKAGE NYLON MOLDINGS

The production of nylon moldings by activated alkaline lactam polymerization is known. It is described in detail in, for example, Kunststoff-Handbuch, Volume VI, Polyamide, Carl-Hanser-Verlag 1966, pages 46 to 49.

In this process, two components, A and B, are employed, component A being a catalyst-containing lactam melt and component B being an activator-containing lactam melt. The two components are mixed, transported into a mold and polymerized therein. This can be done by the reactive injection molding (RIM) method, which is known from polyurethane technology. Since, for example in the polymerization of caprolactam to nylon 6, a reduction in volume by about 15% occurs, the resulting moldings exhibit an irregular surface and shrinkage hollows and bubbles, which cannot be completely eliminated even by forcing in monomers during polymerization.

It is an object of the present invention to overcome these disadvantages and to provide a process for the production of low-shrinkage nylon moldings which are free from bubbles and hollows and possess a smooth surface.

We have found that this object is achieved if the activated alkaline polymerization of lactams is carried out in the presence of from 5 to 80% by weight, based on the lactam, of a polymer P which
1. is completely soluble in the lactam,
2. separates out in the course of the polymerization at a conversion of from 1 to 50%, preferably from 2 to 40%,
3. is composed of two or more chemically different blocks, one or more of these blocks being compatible with polylactam and one or more of them being incompatible therewith, and preferably,
4. possesses functional groups which can be incorporated, as copolymerized units, into the growing polylactam chain.

ε-caprolactam is the preferred lactam but it is also possible to use pyrrolidone, capryolactam, laurolactam, oenantholactam and a corresponding C-substituted lactam.

The polymerization is carried out in the presence of from 5 to 80, preferably from 10 to 30, % by weight, of a polymer P, preferably a graft polymer which contains one or more polystyrene blocks and one or more polyether, polyurethane, nylon, polyester, polyacrylate or polymethacrylate blocks.

Preferred graft polymers P comprise (W) from 2 to 50% by weight of ethylenically unsaturated prepolymers having a number average molecular weight of from 1,000 to 100,000 and containing, on average, from 0.2 to 1.5 olefinic double bonds per prepolymer molecule, and (X) from 98 to 50% by weight of monoolefinically unsaturated monomers, with or without (Y) from 0 to 10% by weight of monoolefinically unsaturated monomers which carry a functional group which can be incorporated, as a copolymerized unit, into the growing polylactam chain, and (Z) from 0 to 10% by weight of polyunsaturated monomers.

Suitable prepolymers (W) are polymers which have a number average molecular weight of from 3,000 to 100,000 preferably from 3,000 to 50,000, particularly preferably from 4,000 to 20,000, and contain, as an arithmetic mean, from 0.2 to 1.5, preferably from 0.5 to 1.2, olefinic double bonds per molecule of prepolymer. The prepolymers are prepared by introducing olefinic double bonds into polymer (a).

These polymers (a) can be commercial polyesters possessing terminal COOH and/or OH groups, nylons possessing terminal COOH and/or $NH_2$ groups, polyetherols, polyesterols, polyurethanes possessing terminal OH and/or NCO groups, polyureas possessing terminal $NH_2$ and/or NCO groups or even polymers or copolymers which are prepared by ionic polymerization and introduction of functional groups by the chain-terminating reaction.

As a rule, the polymers (a) are converted to olefinically unsaturated prepolymers (W) by reacting the terminal groups with monoolefinically unsaturated reagents. Thus, polymers possessing terminal NCO groups can be reacted with compounds which have an olefinic double bond and one or more groups containing acidic hydrogens. Such compounds include olefinically unsaturated carboxylic acids and dicarboxylic acids, e.g. acrylic acid, methacrylic acid, crotonic acid, maleic acid and fumaric acid, the half-esters of the stated dicarboxylic acids, unsaturated alcohols, e.g. alkyl alcohol, ether-alcohols, e.g. trimethylolpropane allyl ether, neopentylglycol allyl ether and hydroxybutyl vinyl ether, ester-alcohols, e.g. hydroxyethyl, hydroxypropyl and hydroxybutyl acrylate and methacrylate, an unsaturated amines, e.g. aminoethyl acrylate and aminoethyl methacrylate.

Polymers (a) possessing terminal OH groups can be converted to prepolymers (W) by reaction with monoolefinically unsaturated carboxylic acids or dicarboxylic acids such as those mentioned above, or with their anhydrides, halides or lower alkyl esters, olefinically unsaturated epoxides, e.g. glycidyl acrylate or methacrylate or glycidyl allyl ether, or even by reaction with diisocyanates and reagents such as those listed for terminal NCO groups.

If the polymers (a) possess terminal COOH groups these polymers can be converted to the prepolymers (W) using the abovementioned olefinically unsaturated alcohols or epoxides, or with diisocyanates and the compounds described for terminal NCO groups.

Polymers (a) possessing terminal $NH_2$ groups can be converted to prepolymers (W) by reaction with the above unsaturated epoxides or with diisocyanates and the H-acidic compounds mentioned for terminal NCO groups.

It is not essential to carry out the preparation of the olefinically unsaturated prepolymers (W) in two steps, i.e. (1) the preparation of the prepolymers (a) and (2) reaction with olefinically unsaturated reagents. In some cases it is even possible to use suitable amounts of olefinically unsaturated compounds at as early a stage as the preparation of the prepolymers in order to obtain the prepolymers (W) directly. In the preparation of polyesters, this includes the use of, in particular, maleic acid or its anhydride or half-ester. Forlexample, it is also possible to prepare polyurethanes using olefinically unsaturated diols, e.g. but-2-ene-1,4-diol, or, where it is to be incorporated as a terminal group, using allyl alcohols or hydroxyethyl, hydroxypropyl or hydroxybutyl acrylate or methacrylate. In polyethers, the above olefinically unsaturated epoxides or alcohols can be incorporated as early as the preparation stage.

However, preferred prepolymers (W) are those which contain terminal double bonds.

The stated reactive groups of the polymers (a) do not have to be terminal ones, but polymers (a) predominantly or exclusively possessing terminal reactive groups are preferably employed. The polymers (a) possess from 1 to 4, preferably from 1 to 2, equivalents of reactive groups per mole.

Further suitable polymers (a) are products obtained by ionic polymerization and functionalized with the aid of the chain-terminating reaction. These include, in particular, active polymers which have been obtained by anionic polymerization and can be functionalized by a chain-terminating reaction, for example with ethylene oxide or propylene oxide. olefinic double bonds can then be introduced by the route described above for terminal OH groups. It is also possible for the compound used as a chain-terminating reagent to contain olefinic double bonds provided that the chain-terminating reaction proceeds very much more rapidly than any polymerization of the olefinic double bond which may take place. Examples of suitable compounds of this type are glycidyl acrylate, glycidyl methacrylate and allyl bromide.

Examples of suitable monomers (X) are vinyl aromatics of 8 to 20 carbon atoms, olefins of 2 to 20 carbon atoms, vinyl carboxylates where the carboxylic acid radical is of 1 to 20 carbon atoms, vinyl-ethers of 3 to 20 carbon atoms, vinyl-ketones, vinyl-halides, allyl compounds, and $\alpha,\beta$-olefinically unsaturated mono- and dicarboxylic acids of 3 to 5 carbon atoms and their nitriles, anhydrides and esters where the alcohol radical is of 1 to 20 carbon atoms. Styrene and methyl methacrylate are preferred.

Suitable components (Y) are those monomers which contain one or more olefinic double bonds, so that free-radical copolymerization with (W) and (X) can take place, and also possess functional groups which are copolymerizable in the activated anionic lactam polymerization.

These include amides of $\alpha,\beta$-olefinically unsaturated carboxylic acids, e.g. acrylamide, methacrylamide, crotonamide, maleic acid monoamide and maleamide, their N-alkyl derivatives where alkyl is of 1 to 12 carbon atoms, N-vinyl compounds, e.g. N-vinylformamide, N-vinylpyrrolidone, N-vinylcaprolactam, N-acryloylcaprolactam and N-methacryloylcaprolactam. Preferred compounds are N-vinyl pyrrolidone, N-vinylcaprolactam, N-acryloylcaprolactam, acrylamide and methacrylamide.

The amount of monomers (Y) in the graft polymer P can be as high as 10% by weight, but is preferably from 0.01 to 8, in particular from 0.1 to 5, % by weight. In general, it is uneconomical to use high amounts of monomers (Y).

Examples of suitable polyunsaturated comonomers (Z) are diolefins of 4 to 10 carbon atoms, esters of olefinically unsaturated carboxylic acids with polyhydric alcohols, and vinyl or allyl ethers of polyhydric alcohols.

In principle, it is also possible to incorporate functional groups, e.g. lactam or urethane groups, into the ethylenically unsaturated prepolymer (W). For example, polyesterol or polyetherol chains can be lengthened by means of diisocyanates, and olefinic double bonds can then be introduced.

As a rule, the graft polymers P are prepared by free-radical copolymerization, which can be initiated by high-energy radiation or preferably by compounds which decompose to give free radicals, e.g. azo compounds, diacyl peroxides, dialkyl peroxides, hydroperoxides or peresters.

The graft polymers P are completely soluble in the lactam but are immiscible with polylactam, so that they separate out at a conversion of from 1 to 50%, preferably from 2 to 40%.

The novel nylon moldings are produced by the conventional method of activated alkaline lactam polymerization, using two components, A and B. Component A is a catalyst-containing lactam melt, while component B is an activator-containing lactam melt.

Examples of suitable catalysts are alkali metal and alkaline earth metal compounds of lactams, e.g. sodium $\epsilon$-caprolactamate, or of short-chain aliphatic carboxylic acids, e.g. sodium formate or potassium formate, or of alcohols of 1 to 6 carbon atoms, e.g. sodium methylate or potassium tert.-butylate. It is also possible to use alkali metal or alkaline earth metal hydrides, hydroxides or carbonates, as well as Grignard compounds. The catalysts are usually employed in an amount of from 0.1 to 10 mole %, based on the total amount of lactam.

Suitable activators are N-acyllactams, e.g. N-acetylcaprolactam, substituted triazines, carbodiimides, cyanamides, mono- and polyisocyanates, and masked isocyanate compounds. They are preferably employed in an amount of from 0.1 to 10 mole %.

The impact strength of the molding materials can be increased by conventional additives, e.g. polyalkylene glycols having molecular weights of from 2,000 to 100,000 or by the addition of reactive or unreactive rubbers.

The polymerization of the lactam can be carried out in the presence of conventional stabilizers. A combination of CuI and KI in a molar ratio of 1:3 is particularly advantageous. This combination is added to the activator-containing component B in an amount corresponding to 50–100 ppm, based on the total amount of lactam, of copper. Other suitable stabilizers are cryptophenols and amines.

The activator-containing component B may also be mixed with not more than 2% by weight of a nucleating agent, such as talc or nylon 2,2, if appropriate together with a peroxide.

Other conventional additives are regulators, pigments, dyes, plasticizers, fillers, fibers, flame-proofing agents and propellants.

It is also possible to add to the activator-containing component B from 1 to 30% by weight, based on the total amount of lactam, of non-crosslinked prepolymeric isocyanates. Examples of suitable substances of this type are those obtained by subjecting isocyanates to chain-lengthening reactions with polyethers/polyesterols. They have an isocyanate content of from 0.1 to 10% by weight. They can be reacted with an equivalent amount of polyol even during the polymerization of the lactam by adding the polyol and, advantageously, a urethane-forming catalyst to the catalyst-containing lactam melt.

It is also possible to add from 1 tp 30% by weight of lactam-soluble polymers, e.g. high molecular weight polyesters, non-crosslinked polyurethanes, polytetrahydrofuran, and nylon copolymers prepared by polycondensation.

Finally, it is also possible to add polymerizable rubbers, which are grafted onto the polyactam chain in situ by free-radical polymerization using peroxides, with or without accelerators, e.g. cobalt naphthenate.

Components A and B are mixed thoroughly at from 70° to 140° C., preferably from 100° to 135° C., transported into a mold, and polymerized therein at from 130° to 200° C. The procedure used for this corresponds to the reactive injection molding technique which was described for polyurethanes by, for example, Piechota and Röhr in Integralschaumstoff, Carl-Hanser-Verlag 1975, pages 34–37.

Relatively small sheets and moldings can be produced using low-pressure metering apparatuses, the material being introduced into the open mold. It is advisable to use small mixing chambers with teflon-covered surfaces and similar stirring elements.

However, the novel moldings are preferably produced using a high-pressure metering apparatus. In this case, the components are mixed by means of a countercurrent spraying technique.

The resulting semi-finished product can then be processed to the finished articles by pressing, preferably at above the melting point of the nylon.

The moldings obtained using the novel process possess excellent surface quality and good mechanical properties and require only short molding times. They are particularly suitable as shaped articles for the automotive industry, for examply bodywork components, such as wings and doors, or for industrial housing components.

In the Examples which follow, parts and percentages are by weight. The K values were measured by the method according to Fikentscher, Cellulosechemie 13, (1932), 58; the DSC values were determined on 7 mg samples at a heating rate of 20° K./min, using a Perkin Elmer instrument.

EXAMPLE 1

(a) Preparation of the graft polymer P 1

80 parts of a polyether prepared using 200 moles of ethylene oxide per mole of ethylene glycol were heated at 120° C. for 30 minutes with 0.8 part of maleic anhydride, 0.9 part of succinic anhydride and 40 parts of toluene. The resulting prepolymer W had a mean molecular weight of 8,040, and 0.8 olefinic double bond per molecule. Thereafter, 320 parts of styrene, 4 parts of benzoyl peroxide and 40 parts of toluene were added in the course of 2½ hours, and polymerization was allowed to continue for 2 hours. The resulting graft polymer P 1 essentially consisted of a polystyrene block with several polyether blocks incorporated in a comb-like manner. 600 parts of $\epsilon$-caprolactam were then added, and the volatile components were distilled off at 100° C. and under a residual pressure of 80 mbar. The solution had a solids content of 42.3% and a K value of 47.2.

(b) Preparation of the nylon molding

Composition of component A:
205.5 parts of $\epsilon$-caprolactam
25.0 parts of a 17.5% strength solution of sodium lactamate in caprolactam.
Composition of component B:
94.5 parts of $\epsilon$-caprolactam
100.0 parts of graft polymer P 1
36.0 parts of a solution comprising 83.5% of caprolactam and 16.5% of hexamethylene diisocyanate.

Experimental procedure

In a low-pressure molding machine of the F series (Elastogran Maschinenbau, Strasslach near Munich), components A and B were mixed, in a ratio of 1:1 and at 125°–135° C., in a mixing head equipped with an aluminum screw mixer operated at 8,000 rpm, the mixture being discharged at a rate of 19.5 g per second. The mixture was poured into an open mold heated at 150° C. The molding time was 1.5 minutes, and a sheet having a satisfactory smooth surface was obtained. The melting point determined by DSC was 222° C., and the K value of the sample (0.5% strength in phenol/o-dichlorobenzene) was 118. Separation of the graft polymer P from the polymerization solution occurred at a conversion of 6.5%.

EXAMPLE 2

(a) Preparation of graft polymer P 2

80 parts of a polyether obtained using 200 moles of ethylene oxide per mole of ethylene glycol were heated at 120° C. for 1 hour together with 0.8 part of maleic anhydride, 0.88 part of succinic anhydride and 40 parts of toluene. The resulting prepolymer W2 had a mean molecular weight of 8,040, and 0.8 olefinic double bond per molecule. Thereafter, 305 parts of styrene, 15 parts of N-vinylpyrrolidone, 4 parts of benzoyl peroxide and 40 parts of toluene were added in the course of 2 hours, polymerization was allowed to continue for 3 hours, the mixture was diluted with 600 parts of molten $\epsilon$-caprolactam, the volatile components were distilled off as described for polymer P 1 and a solution having a solids content of 41.5% and a K value of 43.0 was discharged.

(b) Preparation of graft polymer P 3

80 parts of a polyether obtained using 200 moles of ethylene oxide per mole of ethylene glycol were heated at 50° C. for 1 hour with 40 parts of toluene and 1.3 parts of glycidyl methacrylate. The prepolymer W3 had a molecular weight of 8,100 and 0.9 double bond per molecule. Thereafter, 4 parts of acrylamide were added, the mixture was heated to 80° C., 316 parts of styrene, 4 parts of benzoyl peroxide and 40 parts of ethyl acetate were added in the course of 2 hours, polymerization was allowed to continue for a further 4 hours, 600 parts of $\epsilon$-caprolactam were added and the volatile components were distilled off. The solution had a solids content of 42.3% and a K value of 43.4.

(c) Preparation of the nylon molding

Composition of component A:
101 parts of $\epsilon$-caprolactam
15 parts of a 17.5% strength solution of sodium lactamate in caprolactam
Composition of component B:
24 parts of $\epsilon$-caprolactam
50 parts of graft polymer P2,
25 parts of graft polymer P3,
17 parts of a solution comprising 83.5% of caprolactam and 16.5% of hexamethylene diisocyanate The experiment was carried out as described in Example 1, and the resulting sheet had a satisfactory surface. The melting point determined by DSC was 220° C. and the K value was 113. The Molau test was positive, and the graft polymers P2 and P3 separated out after a conversion of 12.1% was reached.

EXAMPLE 3

(a) Preparation of polymer P 4

A block polyether (W4) was prepared from 16 parts of propylene oxide and 84 parts of ethylene oxide having a number average molecular weight of 5,560 and an average of 1.0 olefinic double bond per molecule; allyl alcohol was used as an initiator and 0.1 part of KOH as a catalyst. 28 parts of this block polyether were taken up in 35 parts of $\epsilon$-caprolactam, the solution was heated to 130° C., 56 parts of $\alpha$-methylstyrene, 0.3 part of acryloylcaprolactam and 0.7 part of benzoyl peroxide in 7 parts of toluene were added in the course of 4 hours, the mixture was stirred for a further 2 hours and volatile components were distilled off at 120° C. and under a residual pressure of 50 mbar. The resulting product had a solids content of 70%.

(b) Preparation of the nylon molding

Composition of component A:
43 parts of caprolactam
7 parts of a 17.5% strength solution of sodium lactamate in caprolactam
Composition of component B:
21.43 parts of polymer P 4
19.32 parts of $\epsilon$-caprolactam
8.75 parts of a solution comprising 83.5% of caprolactam
16.5% of hexamethylene diisocyanate.

Experimental procedure

In a high-pressure machine operating on the basis of the RIM method, components A and B were mixed, in a ratio of 1:1, in a self-purging high-pressure mixing head, and the mixture was discharged, at a rate of 90 cm$^3$/seconds, into a mold heated at 150° C. and having cavity dimensions of 670×270×4 mm.

After 2 minutes, the finished molding was removed. It had a very good surface, and the K value of the sample (0.5% strength in a 1:1 phenol/o-dichlorobenzene mixture) was 117.

We claim:

1. A process for the production of a low-shrinkage nylon molding by activated alkaline polymerization of lactams, wherein the polymerization is carried out in the presence of from 5 to 80% by weight, based on the lactam, of a polymer P which
   1. is completely soluble in the lactam,
   2. separates out in the course of the polymerization at a conversion of from 1 to 50%, and
   3. is composed of two or more chemically different blocks, and wherein the polymer P is a graft polymer comprising
      (W) from 2 to 50% by weight of a polyether prepolymer having a number average molecular weight of from 1,000 to 100,000 and containing, on average, from 0.2 to 1.5 olefinic double bonds per prepolymer molecule, and
      (X) from 98 to 50% by weight of a monomer selected from the group consisting of styrene and methyl methacrylate, with or without
      (Y) from 0 to 10% by weight of monoolefinically unsaturated monomers selected from the group consisting of N-vinylpyrrolidone, N-vinylcaprolactam, acrylamide, methacrylamide and acryloylcaprolactam, and
      (Z) from 0 to 10% by weight of a polyunsaturated monomer selected from the group consisting of diolefins of 4 to 10 carbon atoms, esters of olefinically unsaturated carboxylic acids with polyhydric alcohols and vinyl or allyl ethers of polyhydric alcohols.

2. A process as claimed in claim 1, wherein, in the alkaline lactam polymerization, a Component A, which contains the lactam and a catalyst, and a Component B, which contains the lactam and an activator, are mixed thoroughly at from 70° to 140° C., and the mixture is transported into a mold and polymerized therein at from 130° to 200° C.

3. A process as claimed in claim 1, wherein the polymerization is carried out by the reactive injection molding technique.

4. A process as claimed in claim 2, wherein, as a stabilizer, a cryptophenol, an amine or a mixture of CuI and KI in a molar ratio of 1:3 is added to the activator-containing component B.

* * * * *